(12) United States Patent
Mori

(10) Patent No.: US 7,517,102 B2
(45) Date of Patent: Apr. 14, 2009

(54) DISPLAYING UNIT, OPTICAL GUIDE PLATE, AND INFORMATION DEVICE

(75) Inventor: Eiichi Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 253 days.

(21) Appl. No.: 11/483,640

(22) Filed: Jul. 11, 2006

(65) Prior Publication Data

US 2008/0007483 A1    Jan. 10, 2008

Related U.S. Application Data

(63) Continuation of application No. PCT/JP2004/004027, filed on Mar. 24, 2004.

(51) Int. Cl.
*G01D 11/28* (2006.01)
(52) U.S. Cl. .......................... 362/26; 362/615; 362/633; 349/58; 349/60; 385/146; 385/901
(58) Field of Classification Search ............... 349/58, 349/60; 362/26, 27, 623, 624, 632–634, 362/615; 385/146, 901
See application file for complete search history.

(56) References Cited

U.S. PATENT DOCUMENTS

| | | | |
|---|---|---|---|
| 6,452,649 B1 * | 9/2002 | Ono et al. ...................... | 349/60 |
| 6,513,943 B2 | 2/2003 | Fukuyoshi | |
| 6,762,807 B2 * | 7/2004 | Lee et al. ...................... | 349/58 |
| 7,011,441 B2 * | 3/2006 | Shimojoh ...................... | 362/624 |

FOREIGN PATENT DOCUMENTS

| | | |
|---|---|---|
| JP | 4-56822 A | 2/1992 |
| JP | 10-010325 A | 1/1998 |
| JP | 2000-0014956 | 3/2000 |
| JP | 2000-098377 A | 4/2000 |
| JP | 2001-216828 A | 8/2001 |
| JP | 2001-338508 A | 12/2001 |
| JP | 2003-0097061 | 12/2003 |

\* cited by examiner

*Primary Examiner*—Stephen F Husar
(74) *Attorney, Agent, or Firm*—Fujitsu Patent Center

(57) ABSTRACT

The present invention relates to a displaying unit using a display panel and provides a reinforcing configuration that reinforces an optical guide plate without impairing a degree of freedom in the back space of the optical guide plate. A displaying unit includes an optical guide plate that guides light of a light source for display on a display panel and includes a reinforcing member (reinforcing beam) that bridges over the optical guide plate between side surfaces in the incident direction and the crossing direction of the light.

35 Claims, 20 Drawing Sheets

DISPLAYING UNIT, OPTICAL GUIDE PLATE, AND INFORMATION DEVICE

CROSS-REFERENCE TO RELATED APPLICATIONS

This application is a continuation of International Application No. PCT/JP2004/004027, filed on Mar. 24, 2004, now pending, herein incorporated by reference.

BACKGROUND OF THE INVENTION

1. Field of the Invention

The present invention relates to a reinforcing configuration of an optical guide plate used in a liquid crystal display (LCD) panel, etc., and relates to a displaying unit, an optical guide plate, and information device preventing distortion due to changes in temperature and humidity of use environment.

2. Description of the Related Art

A displaying unit using an LCD panel, etc. has a configuration as shown in FIG. 1, for example. This displaying unit 2 is disposed with an optical guide plate 8 on a backside (non-display side) of a display panel 4 along with a plurality of films 6 therebetween and is disposed with a light source 10 on a side surface of the optical guide plate 8. The light source 10 is surrounded by a reflector 12 to limit a radiation direction of light 14. The light 14 is radiated through the optical guide plate 8 to the backside of the display panel 4. The optical guide plate 8 is an optical guide member that includes a reflecting surface 18 composed of an inclined surface configured with a thicker light entrance portion 16 and a thinner opposite side surface to guide the light 14 from the light source 10 to the backside of the display panel 4 efficiently and uniformly. The displaying unit 2 is disposed with a control substrate 20, a driver IC 22, etc. used for display control.

Such a displaying unit 2 is used in various display apparatus, for example, built into a displaying unit of a portable personal computer and used for information display, and is required to be thinner and lighter. Upon such a request, the optical guide plate 8 is formed as a thin plate and, for example, an acrylic plate is used. If the optical guide plate 8 is formed thinner, the rigidity of the optical guide plate 8 is reduced, and distortion such as expansion and curvature are easily generated depending on changes in environmental temperature and humidity. If the distorted optical guide plate 8 comes in contact with glass cells of the display panel 4, the liquid crystal displays and the outer shape of the displaying unit 2 are affected. For example, as shown by a dotted line a of FIG. 1, if the optical guide plate 8 warps toward the display panel 4, comes in contact with the cells of the display panel 4, applies stress due to the distortion from the optical guide plate 8 to the display panel 4, and changes the gaps of the liquid crystal layer of the display panel 4, the display is affected and the display quality may be reduced. Therefore, the optical guide plate 8 is designed and fabricated so as to warp toward the rear surface, as shown by a dotted line b of FIG. 1. Such a distortion toward the rear surface generates changes in the outer shape of the displaying unit 2.

With regard to the prevention of such a distortion of the displaying unit, prior arts include Japanese Patent Application Laid-Open Publication Nos. 1992-56822 and 1998-10325.

In a liquid crystal display apparatus disclosed in Japanese Patent Application Laid-Open Publication No. 1992-56822, for example, as shown in FIG. 2, a main frame 24 is disposed to surround the peripheral edge of the optical guide plate 8; a plurality of reinforcing frames 26, 28 are disposed between the upper edge and the lower edge of the frame 24; and the frame 24 is reinforced by the reinforcing frames 26, 28 to prevent the distortion of the optical guide plate 8. Since each reinforcing frame 26, 28 is fixed to the frame 24 with screws and has a relatively wide bar shape as shown in FIG. 3, while the frame configuration is strengthened, a thickness t of the optical guide plate 8 and the reinforcing frame 26 (or 28) is increased because the reinforcing frame is disposed in the thickness direction of the frame 24, and the displaying unit 2 is prevented from being thinner and lighter. In the case of the displaying unit 2 not using the frame 24, the reinforcing frames 26, 28 cannot be disposed for reinforcing the frame 24.

In the reinforcing configuration of disposing and closely attaching the wide bar-shaped reinforcing frames 26, 28 to the back surface of the optical guide plate 8, the back surface of the optical guide plate 8 is covered by the reinforcing frames 26, 28 as shown in FIG. 4, and the proportion of the reinforcing frames is increased, although a degree of the reinforcement of the frame 24 is improved, the placement of the control substrate 20 and the driver IC 22 is limited on the back side of the optical guide plate 8 and a degree of freedom is reduced in the design of the control substrate 20, etc. As shown by a dotted line in FIG. 4, the driver IC 22 cannot be disposed in the portions covered by the reinforcing frames 26, 28.

Referring to a backlight apparatus disclosed in Japanese Patent Application Laid-Open Publication No. 1998-10325, for example, as shown in FIG. 5, the rigidity of the optical guide plate 8 is increased by embedding a reinforcing plate 30 in the optical guide plate 8. While the reinforcing plate 30 is located in a direction orthogonal to a cold-cathode tube 32 that is a light source in this case, the reinforcing plate 30 embedded in the optical guide plate 8 affects the propagation of the light 14 in the optical guide plate 8 and generates deflection 34 such as unevenness or shade in the diffusion of the light 14. This affects the liquid crystal display and causes reduction of the display quality. This is caused because the reinforcing plate 30 in the optical guide plate 8 blocks the light 14 and prevents the diffusion of the light 14. Even when the rigidity of the optical guide plate 8 is increased by disposing the reinforcing plate 30 in this way, if the reinforcing plate 30 causes the reduction of the display quality, the disposal of the reinforcing plate 30 has little practicability.

Although techniques of prevention countermeasures for the distortion of the optical guide plate 8 are disclosed for preventing the distortion of the optical guide plate 8 indirectly by disposing the reinforcing frames 26, 28 or for preventing the distortion by embedding the reinforcing plate 30 in the optical guide plate 8 to enhance the rigidity of the optical guide plate 8 directly, a problem is generated when making the display unit 2 be thinner and lighter; the problem is not disclosed with regard to the prevention of the distortion of the optical guide plate 8 while ensuring a degree of freedom of the disposal of the control substrate 20 and the driver IC 22 on the back side; and the techniques disclosed in Japanese Patent Application Laid-Open Publication Nos. 1992-56822 and 1998-10325 cannot solve such a problem.

SUMMARY OF THE INVENTION

The present invention relates to a displaying unit using a display panel and it is an object thereof to provide a displaying unit that solves the aforementioned problem of the prior arts.

Describing the object in detail, the present invention relates to a displaying unit using a display panel and the object thereof is to prevent distortion of an optical guide plate without impairing a degree of freedom in the back space of the optical guide plate.

To achieve the above object, the displaying unit of the present invention is a displaying unit that includes an optical guide plate that guides light of a light source for the display on the display panel and includes a reinforcing member bridging over the optical guide plate between side surfaces in the incident direction and the crossing direction of the light.

To achieve the above object, the optical guide plate of the present invention is an optical guide plate that guides the light of the light source for the display on the display panel and includes the reinforcing member bridging between the side surfaces in the incident direction and the crossing direction of the light on the back side.

To achieve the above object, an information device of the present invention is an information device that includes a processing unit performing information process, a display panel displaying the information process, and an optical guide plate guiding the light of the light source for the display on the display panel and includes the reinforcing member bridging over the optical guide plate between the side surfaces in the incident direction and the crossing direction of the light.

When the displaying unit, the optical guide plate, and the information device are configured with the reinforcing member bridging between the side surfaces for gripping the side surfaces of the optical guide plate, since the optical guide plate is mechanically reinforced between side surfaces by the additional disposal of the reinforcing member and the reinforcement thereof, changes due to changes in temperature and humidity of use environment are prevented and the resistance to environment is enhanced.

Since the reinforcing member is disposed in the incident direction and the crossing direction of the light on the optical guide plate in this case, the reinforcing member does not prevent the disposal of the light source and does not prevent the light diffusion in the optical guide plate.

To achieve the above object, the light source is disposed on the side surface of the displaying unit, and the optical guide plate may be formed with a thicker light entrance surface and a thinner side surface opposite to the light entrance surface and may reflect the light on the back surface of the optical guide plate to guide the light to the back surface of the display panel. That is, such a configuration is not prevented by disposing the reinforcing member.

To achieve the above object, the reinforcing member is disposed on the back side of the optical guide plate, and the thickness of the optical guide plate and the reinforcing member may not exceed the thickness of the light entrance surface of the optical guide plate. In such a configuration, since the reinforcing member is disposed within a range of the thickness of the light entrance surface of the optical guide plate, the thickness of the displaying unit does not increase and the exterior form is not impaired.

To achieve the above object, a control apparatus is disposed on the back surface of the optical guide plate, and the thickness of the optical guide plate and the control apparatus may not exceed the thickness of the light entrance surface of the optical guide plate. In such a configuration, since the control apparatus is disposed within a range of the thickness of the light entrance surface of the optical guide plate, the thickness of the displaying unit does not increase and the exterior form is not impaired.

To achieve the above object, the reinforcing member may be fixed to the side surfaces of the optical guide plate. In such a configuration, the optical guide plate is reinforced by the reinforcing member fixed between the side surfaces of the optical guide plate.

To achieve the above object, the reinforcing member may be constituted by a plurality of beams or may be constituted by coupling each of the beams at the intermediate portion. In such a configuration, the reinforcing member can be constituted by the beams to reinforce the optical guide plate with a compact configuration, and the strength of the reinforcement can be increased.

To achieve the above object, a reflecting member may be sandwiched between the reinforcing member and the optical guide plate. In such a configuration, the reflecting member can be closely attached to the optical guide plate by disposing the reinforcing member without any influence of the reinforcing member to the optical system.

To achieve the above object, the configuration may include a chassis disposed around the optical guide plate, a rib formed on the side surface of the optical guide plate, and a concave portion formed in the chassis correspondingly to the rib, and the rib with the reinforcing member fixed may be inserted into the concave portion of the chassis. In such a configuration, the optical guide plate can be positioned relative to the chassis to combine both components, and the reinforcing member can be fixed with the use of the rib. Since the rib is disposed in the concave portion of the chassis, the reinforcing member is sandwiched between the chassis and the rib, and the fixed state is enhanced.

To achieve the above object, the reinforcing member may be composed of an elastic linear material or may be composed of an angle material, a pipe material, or a channel material. In such a configuration, the rigidity can be acquired for resisting to expansion and distortion due to environmental changes in the optical guide plate depending on characteristics and shapes of materials, and the distortion of the optical guide plate can be prevented by constituting with a member having appropriate elasticity.

To achieve the above object, in the information device of the present invention, the display panel and the optical guide plate may be built into a display case; the processing unit may be built into a device body; and the display case may be coupled to the device body in a movable manner. That is, the optical guide plate with the configuration reinforced by the reinforcing member is built into the display case along with the display panel, and this display case can be configured to be rotatable relative to the device body.

As described above, since the optical guide plate is reinforced by the reinforcing member according to the present invention, the optical guide plate can be prevented from being distorted due to the changes in temperature and humidity of use environment, and the highly reliable displaying unit, optical guide plate, or information device can be achieved.

According to the present invention, the resistance to the changes in temperature and humidity of use environment can be improved, and the display quality is not reduced by the distortion of the optical guide plate.

According to the present invention, the reinforcing member can be disposed on the back surface of the optical guide plate, and the reinforcing configuration can be achieved for the optical guide plate while the optical guide plate can be made thin with the reinforcement, which means that the present invention contributes to the displaying unit, optical guide plate or information device with lower profile and lighter weight.

Other objects, features, and advantages of the present invention will be more apparent by reference to the accompanying drawings and each embodiment.

DETAILED DESCRIPTION OF THE PREFERRED EMBODIMENTS

First Embodiment

Figure 1:
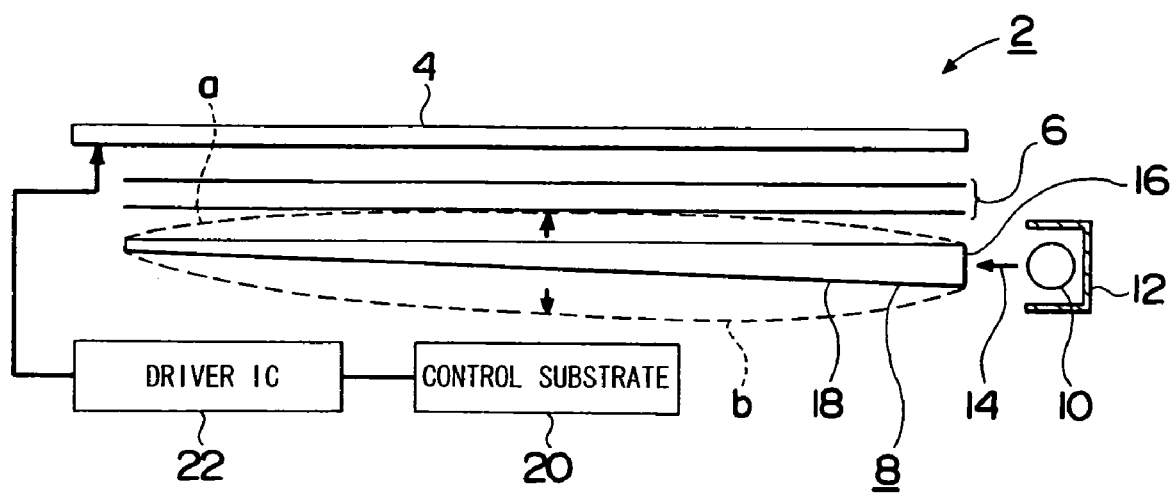
FIG. 1 shows a basic configuration of a displaying unit.
Figure 2:
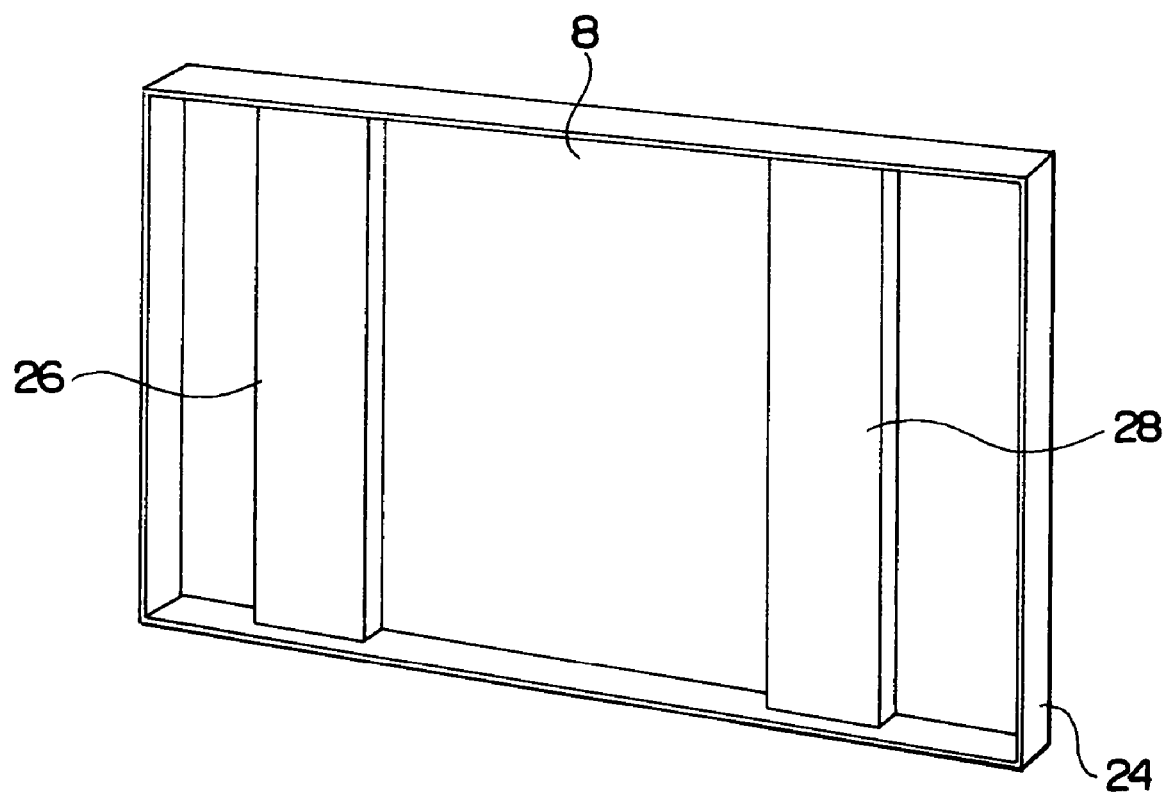
FIG. 2 is a perspective view of a frame used in the displaying unit.
Figure 3:
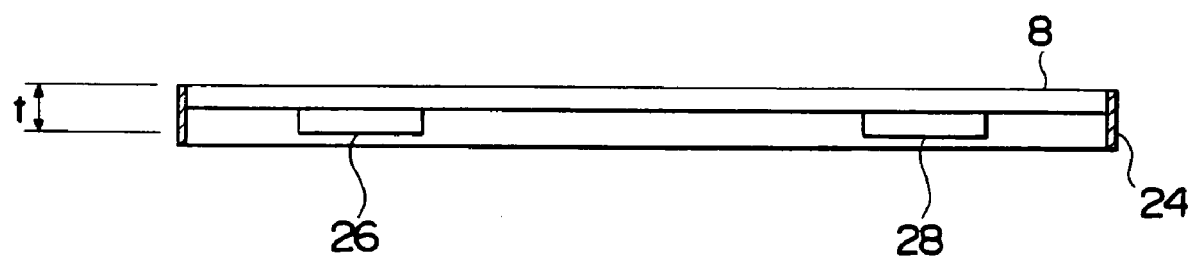
FIG. 3 shows an optical guide plate with a reinforcing frame disposed on the back surface.
Figure 4:
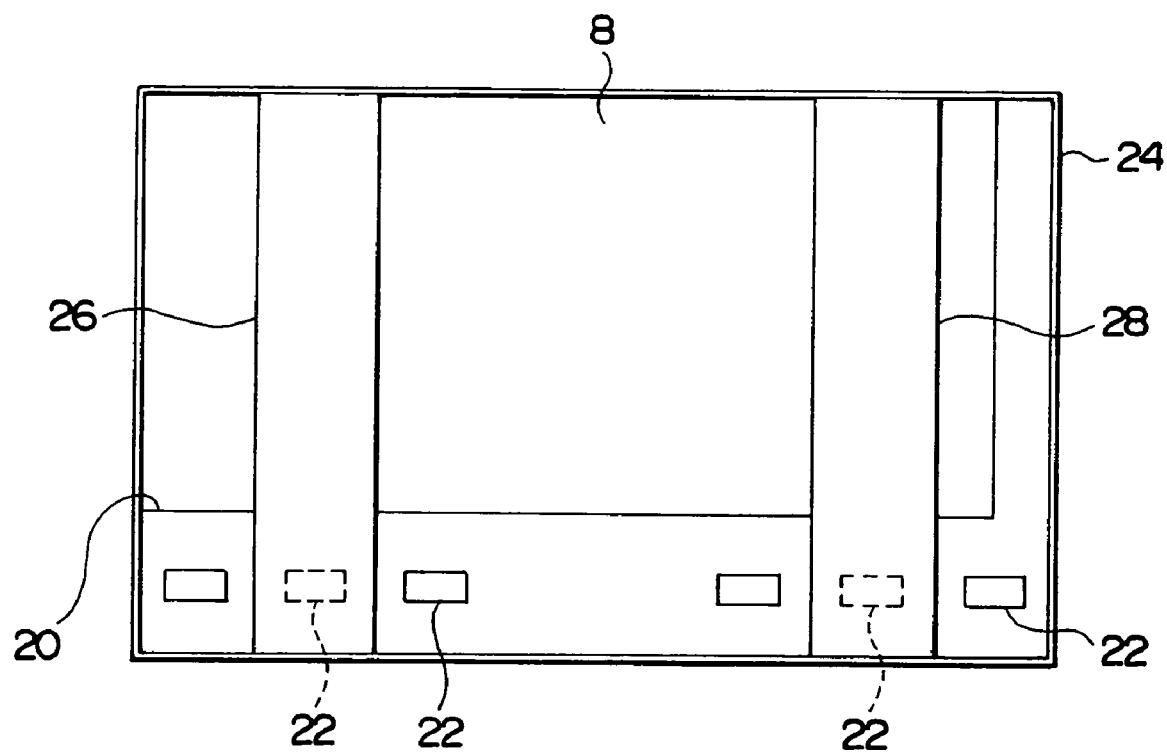
FIG. 4 shows the displaying unit using a frame with the reinforcing frame.
Figure 5:
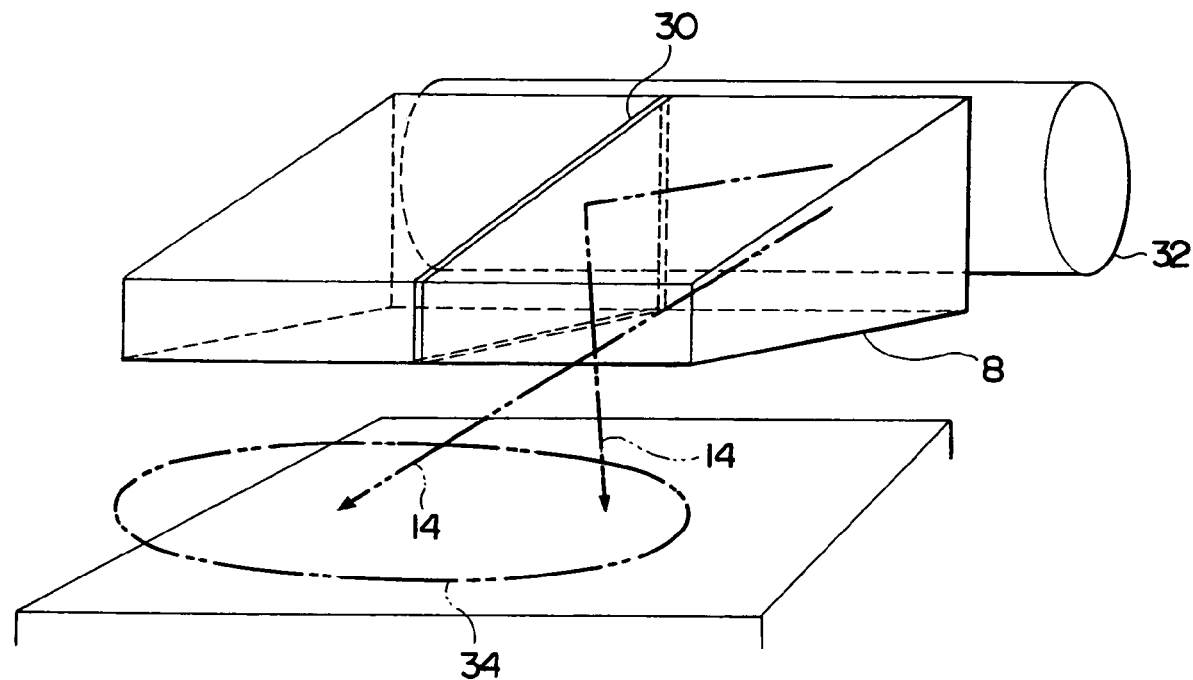
FIG. 5 is a perspective view of influence of a reinforcing plate disposed within an optical guide plate.
Figure 6:
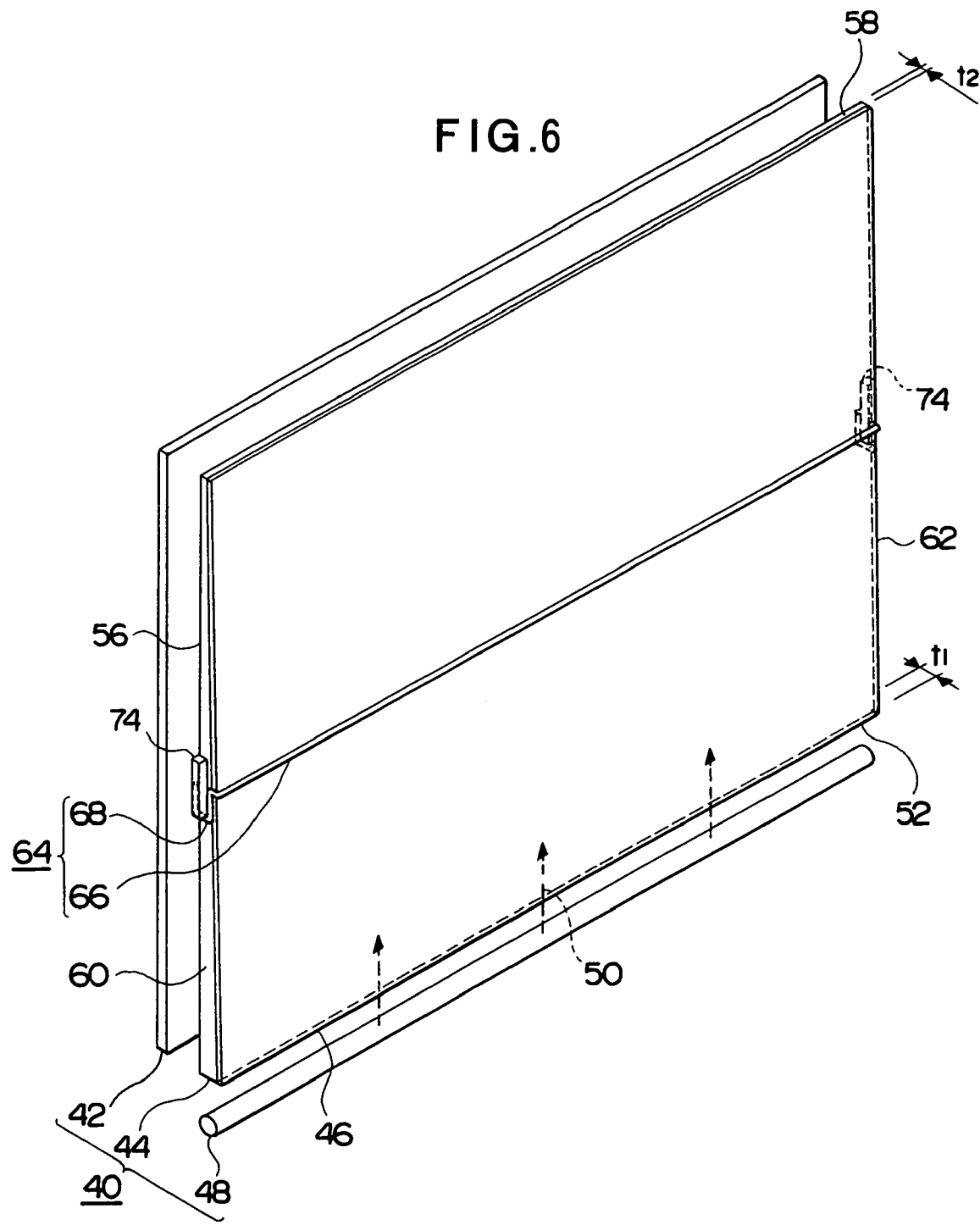
FIG. 6 is a perspective view of a displaying unit according to a first embodiment of the present invention.
Figure 7:
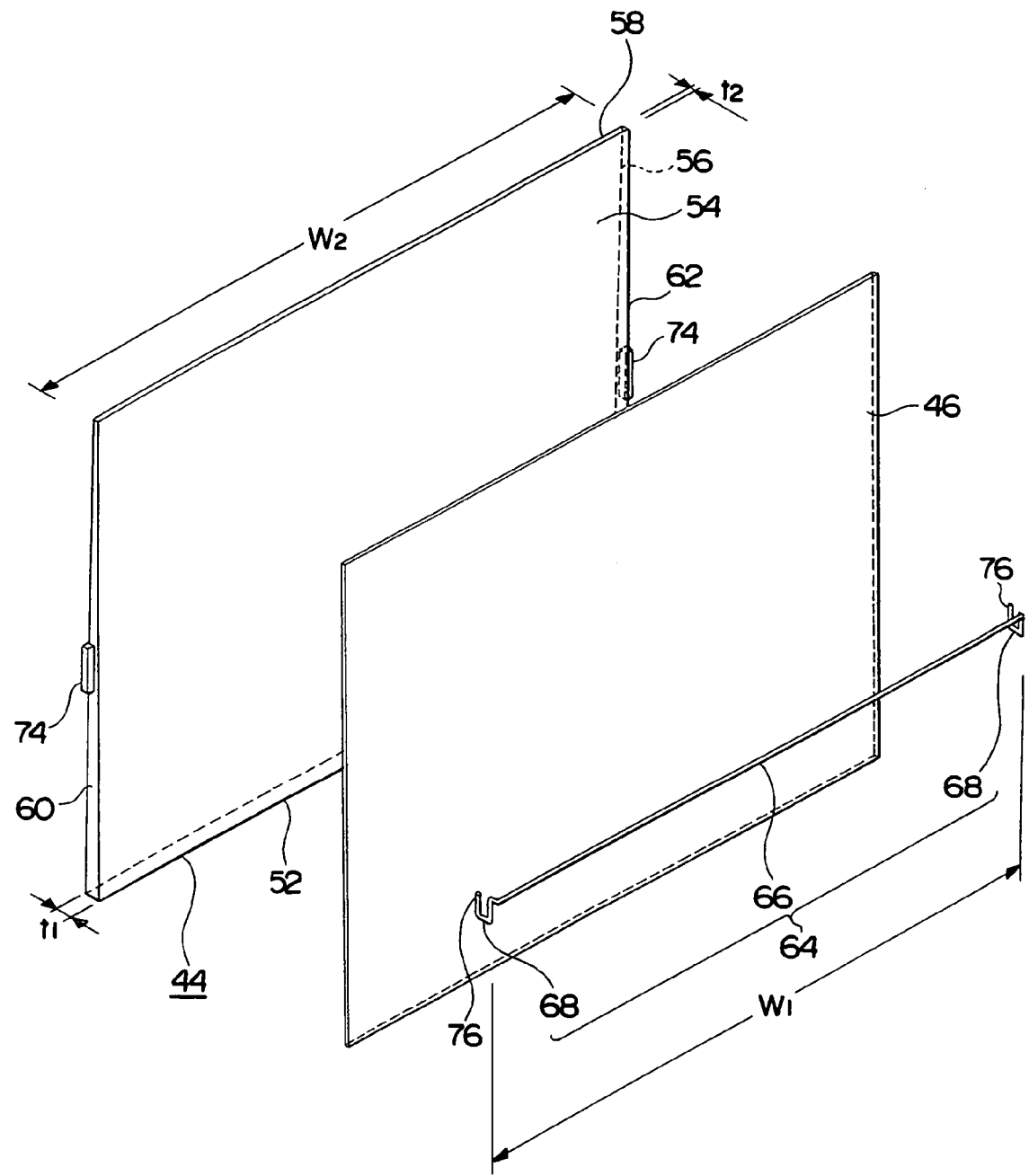
FIG. 7 is an exploded perspective view of a reinforcing configuration of the optical guide plate.
Figure 8:
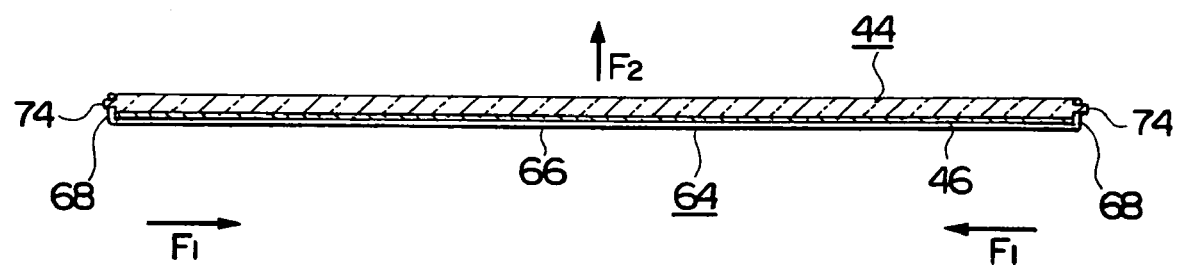
FIG. 8 is a cross-section diagram of a reinforcing portion of the optical guide plate reinforced by a reinforcing beam.
Figure 9:
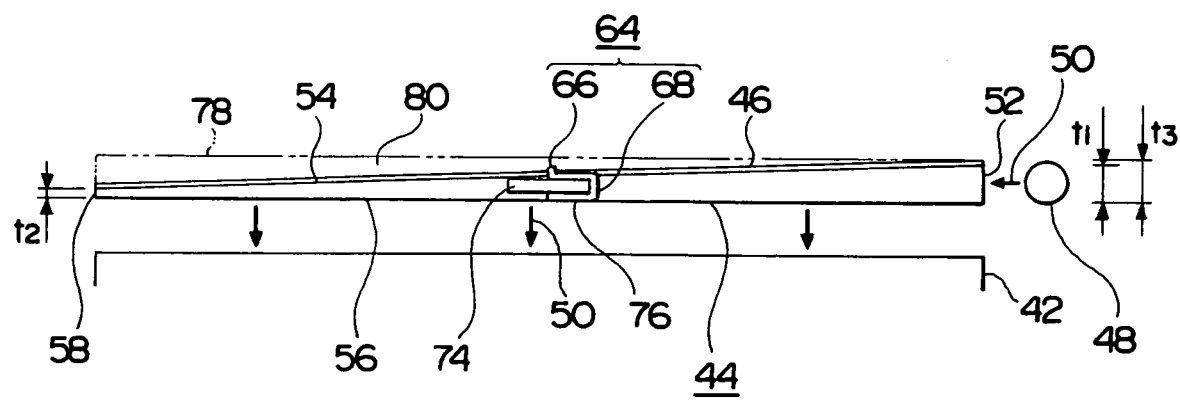
FIG. 9 is a side view of the optical guide plate reinforced by the reinforcing beam.

A first embodiment of the present invention will be described with reference to FIGS. 6 to 9. FIG. 6 is a perspective view of a reinforcing configuration of an optical guide plate of a displaying unit; FIG. 7 is an exploded perspective view of the reinforcing configuration of the optical guide plate; FIG. 8 is a cross-section diagram of a reinforcing portion of the optical guide plate; and FIG. 9 is a side view of the reinforcing configuration of the optical guide plate.

As shown in FIG. 6, this displaying unit 40 includes an optical guide plate 44 and a reflecting sheet 46 on the back surface of a display panel 42 such as a liquid crystal display (LCD) panel. A side surface of the displaying unit 40 is disposed with a light source 48 composed of, for example, a cold-cathode tube, etc. on the light entrance side of the optical guide plate 44, and the back surface of the display panel 42 is irradiated with light 50 emitted from the light source 48 through the optical guide plate 44. The optical guide plate 44 is an optical guide member existing between the light source 48 and the display panel 42, is a configuration for uniformly radiating the back side of the display panel 42 with the light 50 from the light source 48, and is made of a transparent optical guide material, for example, a synthetic resin or glass. Although the optical guide plate 44 of this embodiment is a rectangular thin plate as shown in FIG. 7, with regard to the shape and functionality, a flat hexahedron is constituted by including a light entrance surface 52, a reflecting surface 54, and a light exit surface 56 as well as side surfaces 58, 60 and 62.

The light entrance surface 52 is a surface allowing the entry of the light from the light source 48, and a thickness $t_1$ of the light entrance surface 52 is set larger than a thickness $t_2$ ($<t_1$) of the opposite side surface 58 to set a larger light entrance area of the light 50. The reflecting surface 54 is a surface that reflects the light 50 diffusely in cooperation with the light reflecting function of the reflecting sheet 46 to guide the light 50 toward the light exist surface 56, and constitutes an inclined surface relative to the light exist surface 56 and nonparallel surface to the light exist surface 56 to receive the light 50 from the light entrance surface 52 and to enhance the light reflecting function. The reflecting sheet 46 has the same shape as the reflecting surface 54 and the reflecting surface 54 is formed with, for example, an uneven surface that generates the diffused reflection. The light exist surface 56 is a surface that emit the light 50 from the light source 48 to the display panel 42 and is constituted by a flat surface, for example. The opposite side surfaces 60, 62 constitute trapezoidal surfaces since the thicknesses $t_1$, $t_2$ of the light entrance surface 52 and the side surface 58 are different ($t_1>t_2$) and the reflecting surface 54 and the light exist surface 56 constitute nonparallel surfaces.

A reinforcing beam 64 is attached as a reinforcing member between the side surfaces 60, 62 of the optical guide plate 44; the reinforcing beam 64 is disposed between the side surfaces 60, 62 in the incident direction and the crossing direction of the light 50; and the optical guide plate 44 is gripped by the reinforcing beam 64 disposed between the side surfaces 60, 62. That is, the reinforcing beam 64 includes a bridging portion 66 that bridges between the side surfaces 60, 62 of the optical guide plate 44 and a hooking portion 68 that is a fixing portion for fixing the reinforcing beam 64 at both ends of the bridging portion 66 and, is, for example, a member with high rigidity and elasticity, which is formed with a metal wire made of metal such as stainless steel, for example. In this embodiment, the bridging portion 66 is constituted by a single beam. Prismatic ribs 74 are formed with the same member as the optical guide plate 44 on the side surfaces 60, 62 of the optical guide plate 44, and each hooking portion 68 of the reinforcing beam 64 is hooked to each rib 74 to dispose the bridging portion 66 along with the reflecting sheet 46 lying on the back surface of the optical guide plate 44. In this embodiment, to fix the rectangular rib 74, each hooking portion 68 has an engaging end 76 in a bending shape for engaging a member extended from the bridging portion 66 along a peripheral surface of the rig 74, which is bended so as to go around the rib 74 to the opposite surface thereof.

Description will be made of the reinforcing effect of the optical guide plate 44 due to the reinforcing beam 64 in such a configuration.

An interval width $W_1$ of each hooking portion 68 of the reinforcing beam 64 is set equal to a width $W_2$ of the side surface 58 of the optical guide plate 44 or slightly smaller than the width $W_2$, i.e., set to $W_1 \leqq W_2$. If the bridging portion 66 is formed with a metal wire, such a width setting can be achieved arbitrarily with the length and bends thereof. As shown in FIG. 8, when such a reinforcing beam 64 is fixed to the optical guide plate 44 with the hooking portions 68 fixed to the ribs 74 of the side surfaces 60, 62 of the optical guide plate 44, a tensile force or restoring force is exerted on the reinforcing beam 64 on the back surface of the optical guide plate 44 depending on the width between the hooking portions 68 and the width of the optical guide plate 44 disposed therebetween to maintain the optical guide plate 44 between the side surfaces 60, 62 in a held state between the hooking portions 68 of the reinforcing beam 64, and the bridging portion 66 is maintained in a close contact state on the reflecting sheet 46 on the back surface of the optical guide plate 44. As a result, due to the tensile force exerted on the reinforcing beam 64 or the restoring force of the reinforcing beam 64 returning to the original shape, a force F is applied from each hooking portion 68 to the optical guide plate 44 between the side surfaces 60, 62, and is exerted on the compression direction of the optical guide plate 44. In this case, when the bridging portion 66 is bent toward and attached closely to the optical guide plate 44, a force $F_2$ is applied from the bridging portion 66.

When the optical guide plate 44 is reinforced by disposing such a reinforcing beam 64, the rigidity is enhanced and the distortion is prevented. In such an optical guide plate 44, the resistance to environmental changes can be enhanced, and since the optical guide plate 44 is not distorted and can maintain a flat plate state of the manufacturing time if environmental temperature or environmental humidity is changed, the optical guide plate 44 can be prevented from contacting the display panel 42 due to the distortion, and the reduction of the display quality, etc. due to the contact can be prevented.

For example, although it has been understood that a formed acrylic plate is distorted in high temperature and high humidity because of a remaining stress generated when formed, when a formed piece of the acrylic plate is used for the optical guide plate 44, if the optical guide plate 44 is held between the side surfaces 60, 62 by the reinforcing beam 64 including the bridging portion 66 bridging between the side surfaces 60, 62 and the back surface thereof is contacted with the bridging portion 66, since the optical guide plate 44 is reinforced mechanically and, for the distortion caused in high temperature and high humidity, the holding force of the reinforcing beam 64 can overcome and cancel out the distortion due to the remaining stress of the optical guide plate 44, the distortion of the optical guide plate 44 can be prevented.

Although the holding form of the reinforcing beam 64 in this embodiment is a form of holding the optical guide plate 44 between the side surfaces 60, 62 by applying pressure ($W_1 \leq W_2$), the distortion of the optical guide plate 44 may be prevented because of a spontaneous pressurized state acquired by slight stretching of the optical guide plate 44 in the width direction acting on the reinforcing beam 64.

In this embodiment, since the bridging portion 66 of the reinforcing beam 64 is disposed on the optical guide plate 44 in the incident direction and the crossing direction of the light 50, that is, the hooking portions 68 are attached to the ribs 74 that is the fixing portions included on the side surfaces 60, 62, the reinforcing beam 64 can be disposed away from the light source 48 and does not obstruct the disposal of the light source 48. Since the bridging portion 66 is disposed on the back surface of the optical guide plate 44, the reinforcing beam 64 does not block the light diffusion in the optical guide plate 44.

As shown in FIG. 9, the optical guide plate 44 can include: the reflecting surface 54 composed of an inclined surface formed with the thicker light entrance surface 52 of the light 50 and the thinner side surface 58 opposite to the light entrance surface 52; and the bridging portion 66 within a space 80 formed by a virtual surface 78 assumed from the thickness $t_1$ of the light entrance surface 52 over the reflecting surface 54. Since the bridging portion 66 is disposed within the space 80 that is a margin space and the bridging portion 66 can be contained within the plane of the virtual surface 78 and within a thickness $t_3$ of the optical guide plate 44 and the reflecting sheet 46, the thickness of the optical guide plate 44 is not increased and, therefore, the thickness of the displaying unit 40 is not increased. That is, if the reinforcing beam 64 is disposed on the back surface of the optical guide plate 44 and if the thickness of the optical guide plate 44 is added to that of the reinforcing beam 64, the thickness does not exceed the thickness $t_1$ of the light entrance surface 52 of the optical guide plate 44. In other words, if the displaying unit 40 has a thickness same as before, since the displaying unit 40 with enhanced resistance to environmental changes can be achieved and the optical guide plate 44 can be formed thinner because the rigidity is enhanced by disposing the reinforcing beam 64, the displaying unit 40 can further be made thinner and lighter. Since the reinforcing beam 64 is disposed within the thickness including the thickness of the reflecting sheet 46 in this embodiment, the reinforcing beam 64 is disposed within the thickness $t_1$ of the light entrance surface 52 of the optical guide plate 44 with a margin.

Second Embodiment

Figure 10:
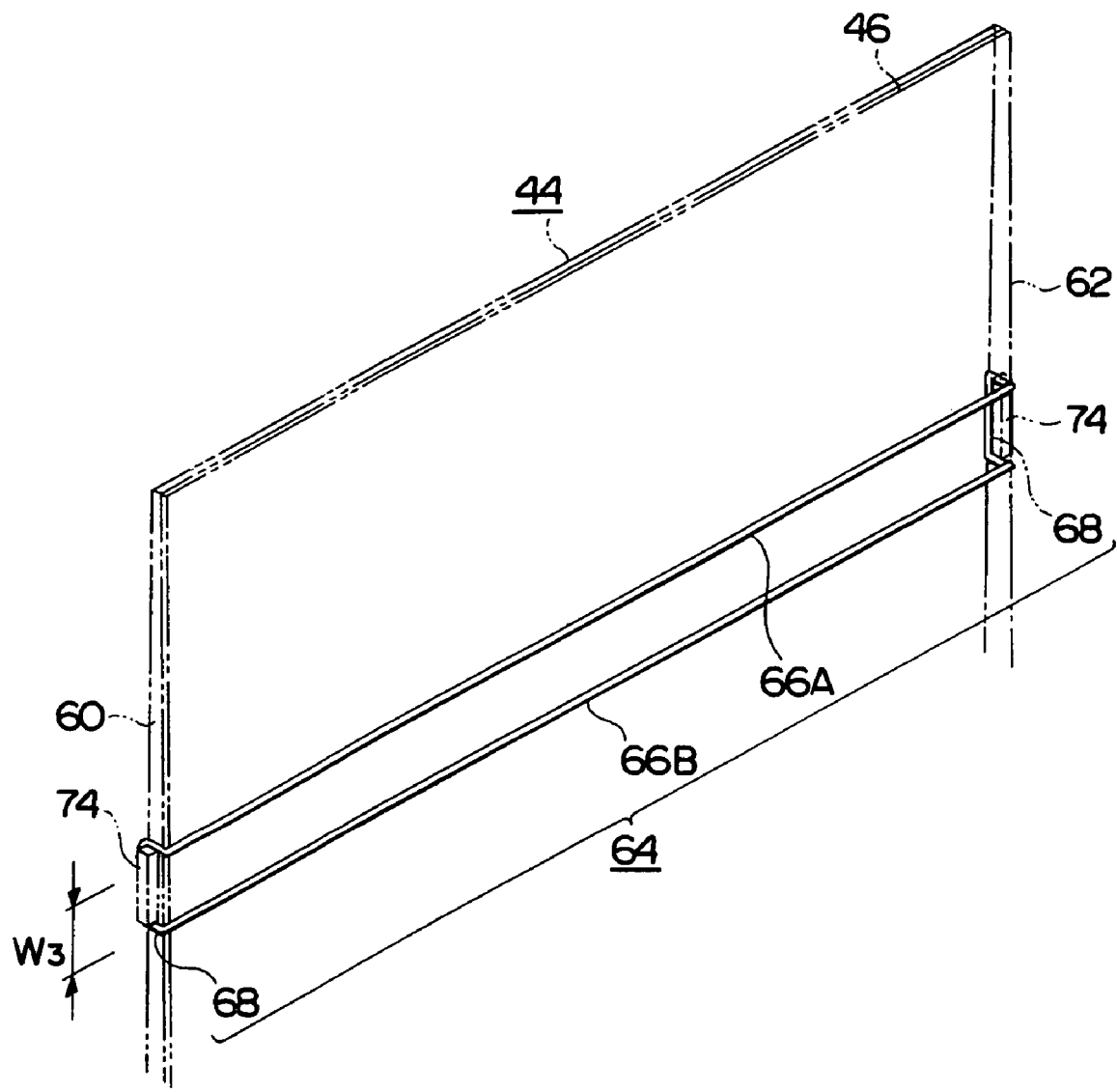
FIG. 10 is a perspective view of an optical guide plate and a reinforcing beam of a displaying unit according to a second embodiment of the present invention.

A second embodiment of the present invention will be described with reference to FIG. 10. FIG. 10 is a perspective view of a reinforcing configuration using a reinforcing beam according to the second embodiment.

In this reinforcing beam 64 according to the second embodiment, the bridging portion 66 is constituted by two upper and lower beams 66A, 66B by looping a metal wire, and U-shaped hooking portions 68 is bent toward the ribs 74 to hook the ribs 74 of the optical guide plate 44.

In such a configuration, since the reinforcing beam 64 includes the bridging portion 66 including the beams 66A, 66B with an interval corresponding to a width $W_3$ of the ribs 74, the holding strength of the optical guide plate 44 can be increased to enhance the reinforcement to prevent the distortion of the optical guide plate 44 due to changes in environmental temperature and environmental humidity, and if the displaying unit 40 is constituted with the use of the optical guide plate 44 reinforced in this way, the same advantages as the first embodiment can be acquired.

Third Embodiment

Figure 11:
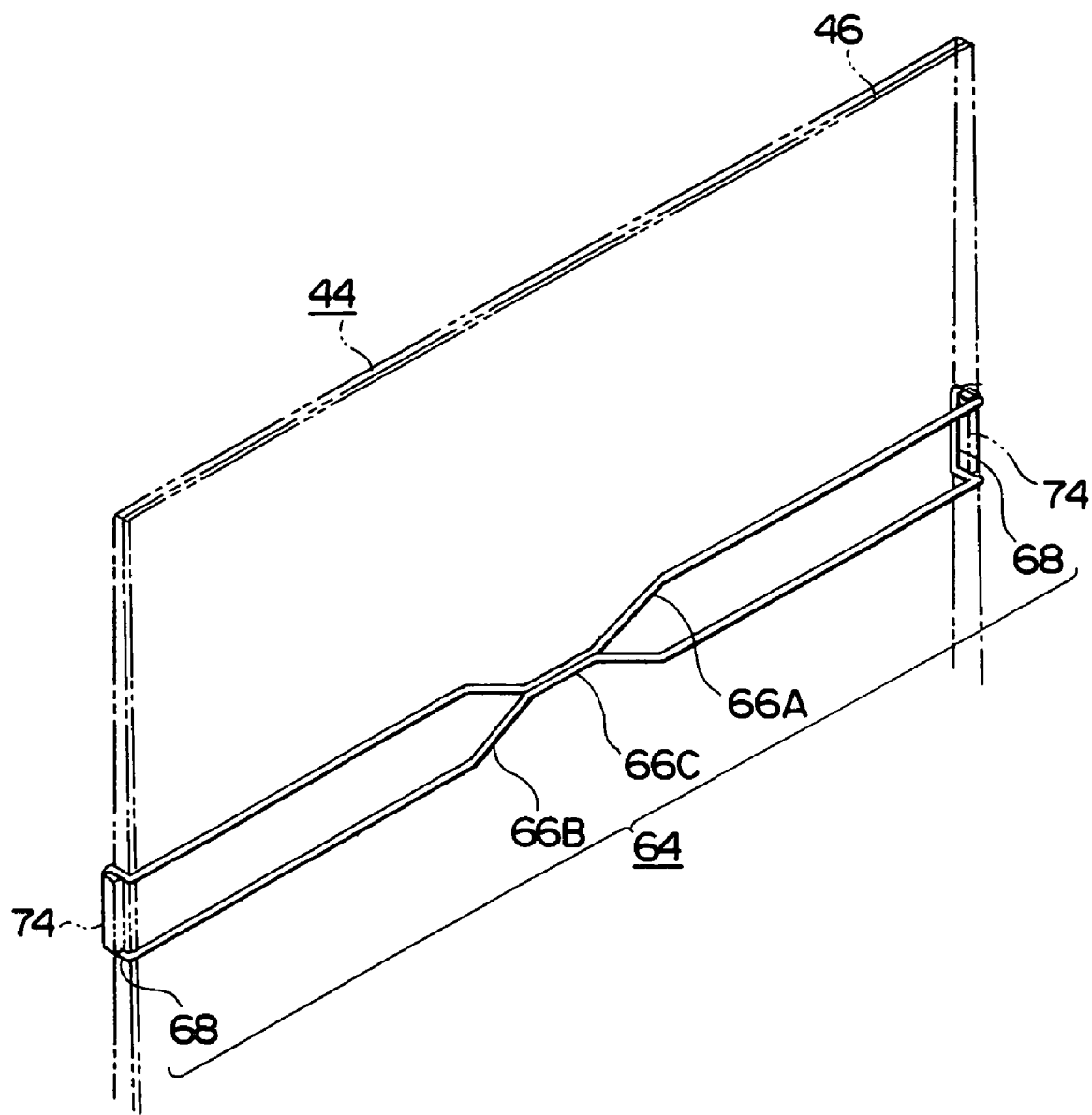
FIG. 11 is a perspective view of an optical guide plate and a reinforcing beam of a displaying unit according to a third embodiment of the present invention.

A third embodiment of the present invention will be described with reference to FIG. 11. FIG. 11 is a perspective view of a reinforcing configuration using a reinforcing beam according to the third embodiment.

In this reinforcing beam 64 according to the third embodiment, by looping a metal wire, U-shaped hooking portions 68 is bent toward the ribs 74 to hook the ribs 74 of the optical guide plate 44 and the bridging portion 66 is constituted by a plurality of beams 66A, 66B, which are coupled and bundled at the intermediate parts thereof in a coupling portion 66C to form a cross-beam configuration.

In such a configuration, since the beams 66A, 66B of the bridging portion 66 are coupled at a coupling portion 66C of the intermediate parts, the reinforcing beam 64 is further strengthened and the optical guide plate 44 is further reinforced. Therefore, the optical guide plate 44 can be prevented from being distorted due to changes in environmental temperature and environmental humidity and if the displaying unit 40 is constituted with the use of the optical guide plate 44 reinforced in this way, the same advantages as the above embodiments can be acquired.

Fourth Embodiment

Figure 12:
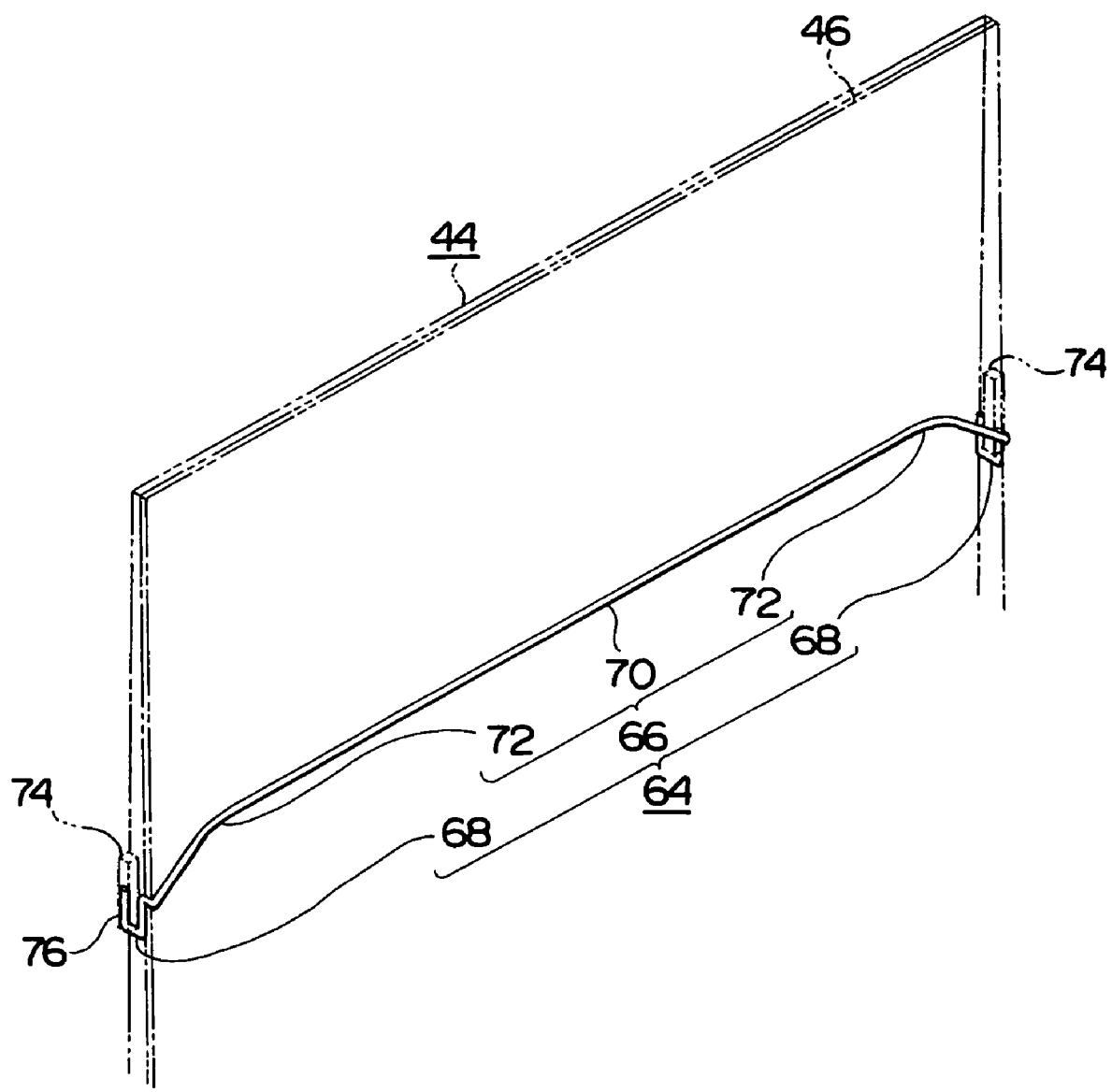
FIG. 12 is a perspective view of an optical guide plate and a reinforcing beam of a displaying unit according to a fourth embodiment of the present invention.

A fourth embodiment of the present invention will be described with reference to FIGS. 12 and 13. FIG. 12 is a perspective view of a reinforcing configuration using a reinforcing beam according to the fourth embodiment and FIG. 13 is a cross-section diagram of the reinforcing configuration portion.

In this reinforcing beam 64 according to the fourth embodiment, a contacting portion 70 projecting and closely attaching to the optical guide plate 44 is formed in the bridging portion 66 along with a pair of bending portions 72.

Figure 13:
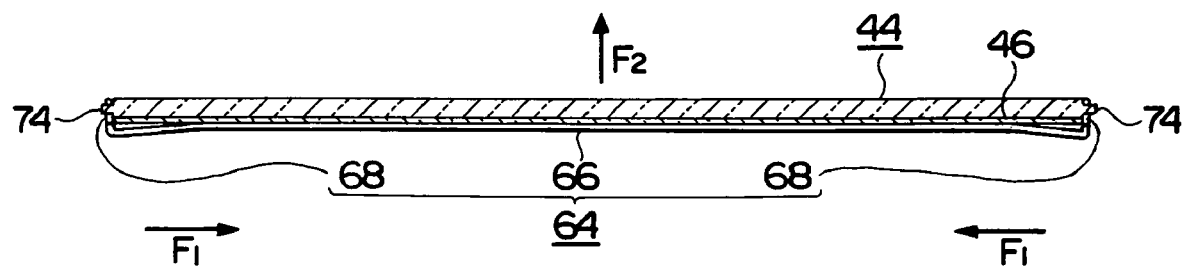
FIG. 13 is a cross-section diagram of the optical guide plate reinforced by the reinforcing beam.

In such a configuration, as shown in FIG. 13, when the reinforcing beam 64 is fixed to the optical guide plate 44 with the hooking portions 68 fixed to the ribs 74 of the side surfaces 60, 62 of the optical guide plate 44, a tensile force or restoring force is exerted on the reinforcing beam 64 on the back surface of the optical guide plate 44 in the width direction of the hooking portions 68 to maintain the optical guide plate 44 between the side surfaces 60, 62 in a held state between the hooking portions 68 of the reinforcing beam 64, and the contacting portion 70 is maintained in a close contact state on the reflecting sheet 46 on the back surface of the optical guide plate 44. As a result, due to the tensile force exerted on the reinforcing beam 64 or the restoring force of the reinforcing beam 64 returning to the original shape on the optical guide plate 44, a force $F_1$ from the hooking portions 68 and a force $F_2$ from the contacting portion 70 can act and balance on the optical guide plate 44 to reinforce the optical guide plate 44.

Fifth Embodiment

Figure 14:
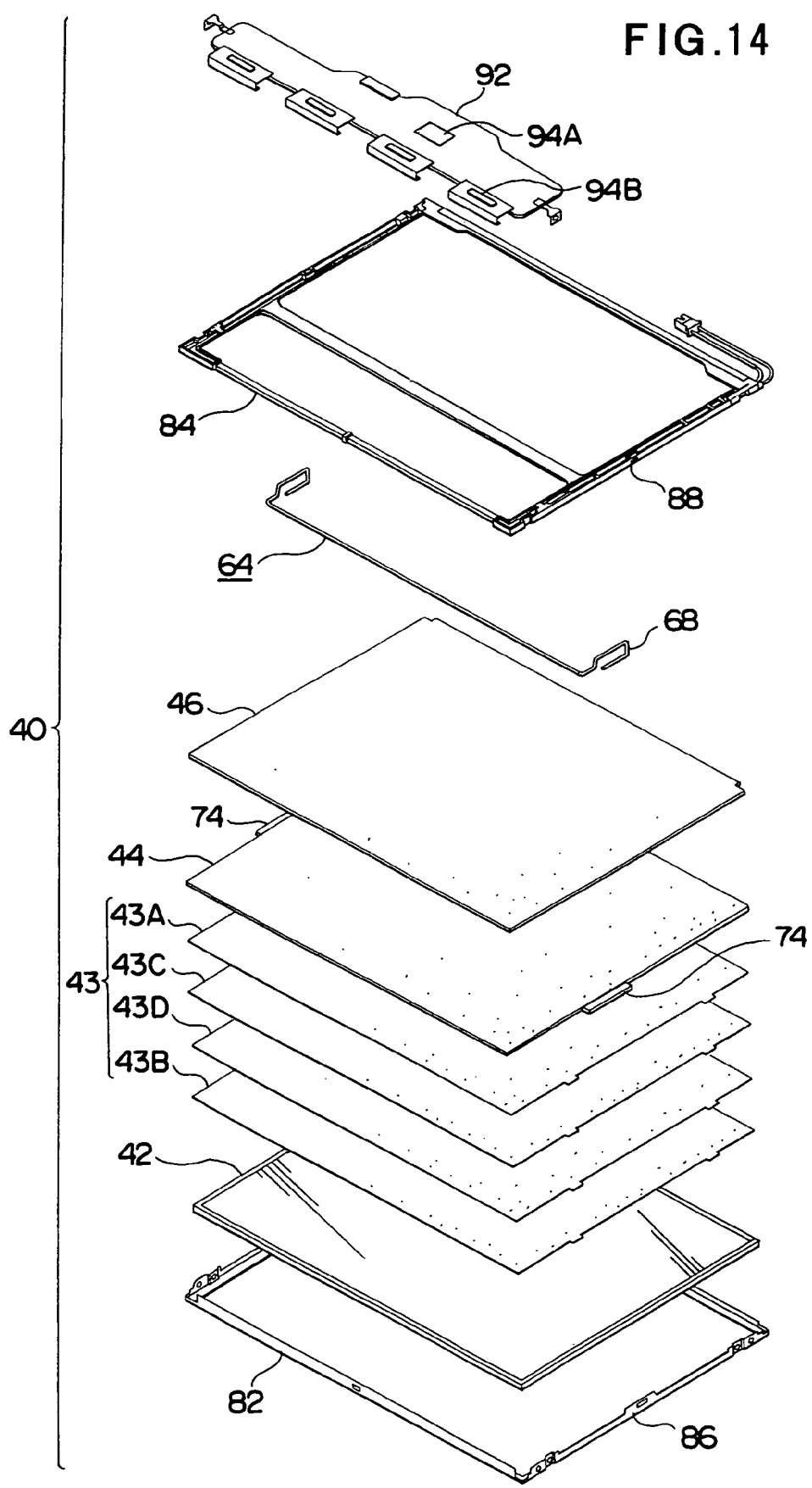
FIG. 14 is an exploded perspective view of a displaying unit according to a fifth embodiment of the present invention.
Figure 15:
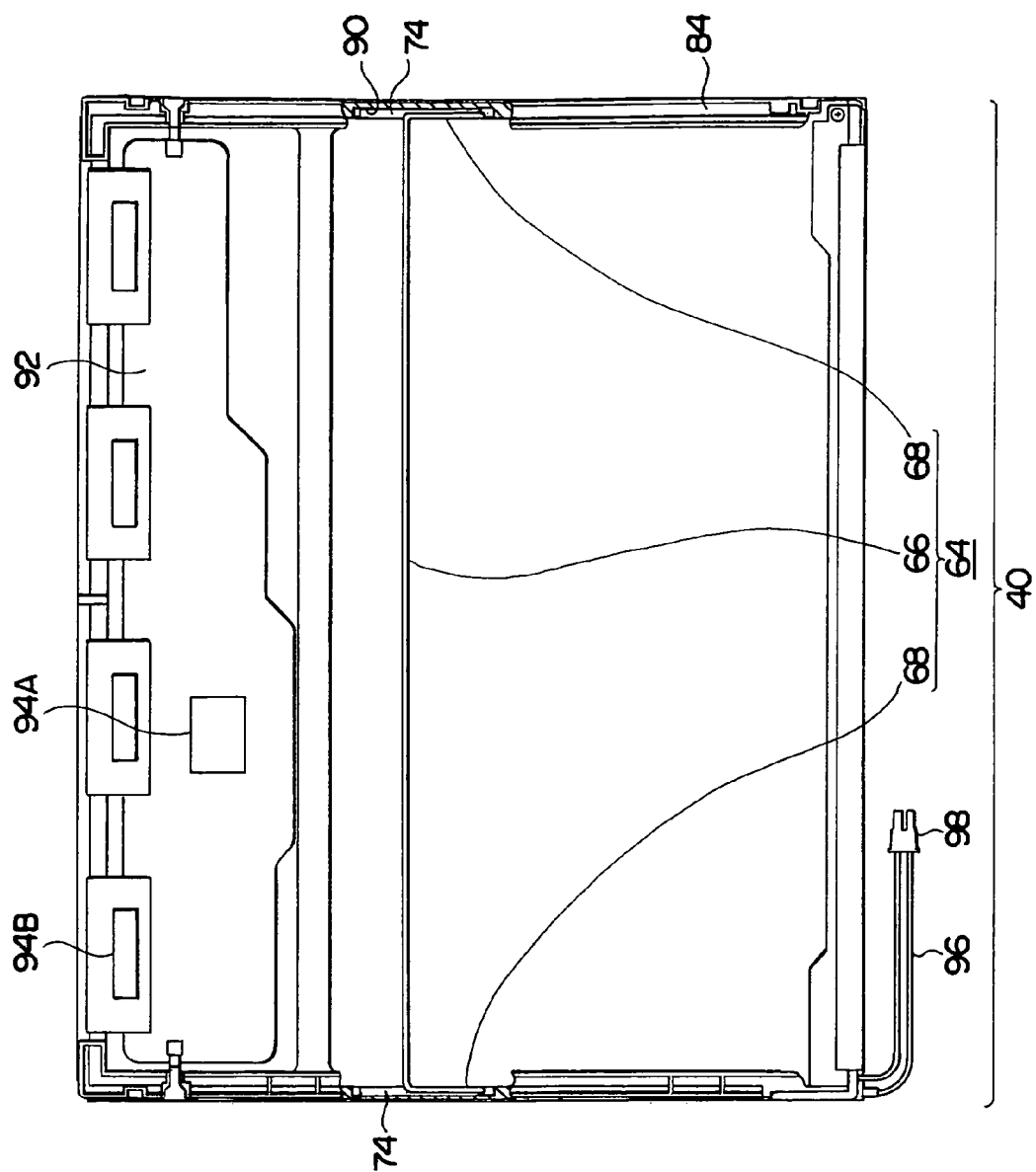
FIG. 15 is a back view of the displaying unit according to the fifth embodiment.

A fifth embodiment of the present invention will be described with reference to FIGS. 14 and 15. FIG. 14 is an exploded perspective view of a displaying unit according to a fifth embodiment and FIG. 15 is a back view of the assembled displaying unit.

The displaying unit 40 includes a rectangular frame 82 made of metal and this frame 82 is disposed with the display panel 42, an optical laminated sheet 43, the optical guide plate 44, the reflecting sheet 46, and a chassis 84 made of synthetic resin. The optical laminated sheet 43 constitutes sheets with functions for brightness control and light diffusion and is formed by laminating two light diffusion sheets 43A, 43B and two lens sheets 43C, 43D in this embodiment. A hooking portion 86 is formed on the side of the frame 82 to fix the chassis 84, and a projecting portion 88 formed on the side of the chassis 84 is inserted into the hooking portion 86 to combine the frame 82 and the chassis 84, which sandwich and hold the display panel 42, the optical laminated sheet 43, the optical guide plate 44, and the reflecting sheet 46 therebetween. The ribs 74 used for positioning and fixing the reinforcing beam 64 are formed on the both sides of the optical guide plate 44, and concave portions 90 (FIG. 15) are formed in the chassis 84 correspondingly to the ribs 74 to position the ribs 74 and to insert and fix the ribs 74.

Before combining the optical guide plate 44 and the chassis 84, the reinforcing beam 64 is attached to the optical guide plate 44 by hooking the hooking portions 68 of the reinforcing beam 64 on the ribs 74. As described above, the optical guide plate 44 is reinforced by the reinforcing beam 64.

After the reinforcing beam 64 is attached to the ribs 74, the optical guide plate 44 is combined with the chassis 84 by inserting and positioning the ribs 74 into the concave portions 90 of the chassis 84. The reinforcing beam 64 attached to the ribs 74 is inserted into the concave portions 90 of the chassis 84 and is gripped and fixed between the ribs 74 of the optical guide plate 44 and the chassis 84. As a result, the fixing strength of the reinforcing beam 64 is enhanced by combining the chassis 84 and the optical guide plate 44.

The chassis 84 is attached with a cold-cathode tube that is the light source 48 and is disposed with a control substrate 92 that is a control apparatus for display control of the display panel 42, and the control substrate 92 is disposed with a control IC 94A, a plurality of driver IC 94B, etc. The light source 48 is supplied with electric power through a plug 98 attached to the end of a wire 96 from an inverter power source, etc.

Since the reinforcing beam 64 reinforcing the optical guide plate 44 is constituted by a linear material such as a metal wire in this way and the reinforcing beam 64 is attached in the form of bridging the center portions of the optical guide plate 44, the disposal space of the control substrate 92 is not reduced on the back surface of the optical guide plate 44, and the control substrate 92 is also disposed on the back surface of the optical guide plate 44 with a margin in this embodiment. That is, since the control apparatuses such as the control substrate 92 and the control IC 94A are disposed on the back surface of the optical guide plate 44 and the thickness of the control apparatuses and the optical guide plate 44 is within a range of the thickness ($t_1$) of the light entrance surface 52 of the optical guide plate 44, the displaying unit 40 can be made thinner. The control IC 94A and the driver IC 94B on the control substrate 92 are not limited in the arrangement by the reinforcing beam 64 and can be set and arranged freely at the positions on the top surface of the control substrate 92. As a result, the degree of freedom is increased in the design of the control circuit.

If the positions of the ribs 74 are set at the positions near the center of the height of the display panel 42, the thickness of the displaying unit 40 is not increased since the optical guide plate 44 is gradually thinned down in a wedge shape (FIG. 9) and a space is ensured for disposing the reinforcing beam 64 as described above. At the time of assembling the displaying unit 40, the reinforcing beam 64 is attached to the back side of the optical guide plate 44 after combining the optical guide plate 44 and the reflecting sheet 46 (i.e., reflecting plate) and, therefore, the reinforcing beam 64 has no influence on the optical system such as the optical guide plate 44.

Since the reinforcing beam 64 is fixed using the ribs 74 used for fixing and positioning the optical guide plate 44 to the chassis 84 and does not block the incident light and diffusion light of the optical guide plate 44, the reinforcing beam 64 has no influence on the light radiation to the display panel 42 and does not reduce the display quality. Since the reinforcing beam 64 is disposed on the optical guide plate 44 and is fixed to the optical guide plate 44 to reinforce the optical guide plate 44, the reinforcing beam 64 can be applied to the displaying unit 40 without the frame 82.

Figure 16:
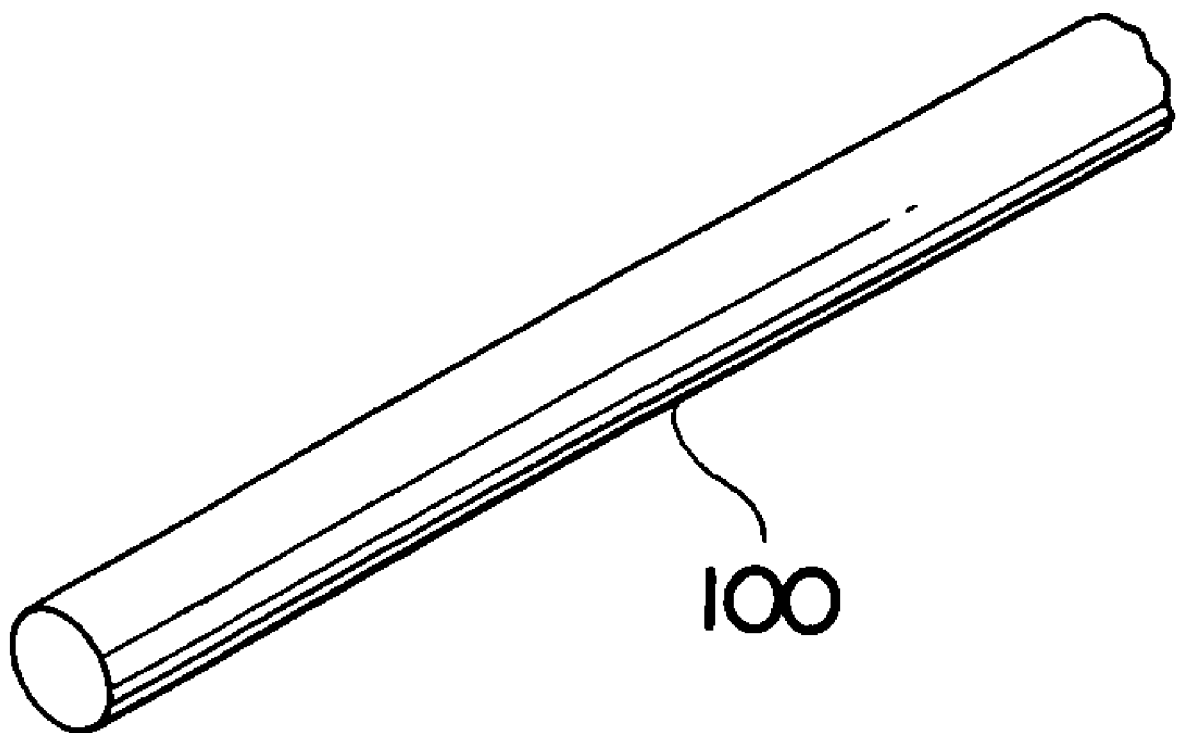
FIG. 16 is a perspective view of a form of a linear material used for the reinforcing beam.
Figure 17:
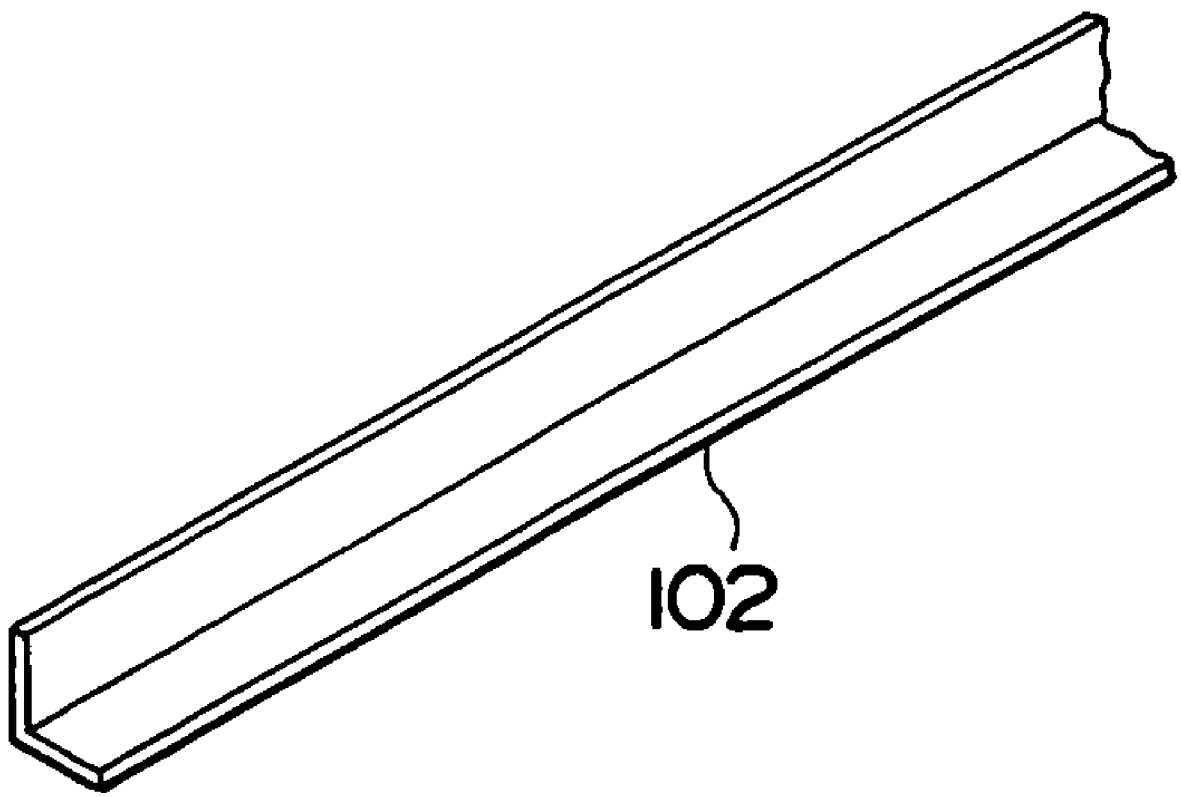
FIG. 17 is a perspective view of a form of a linear material used for the reinforcing beam.
Figure 18:
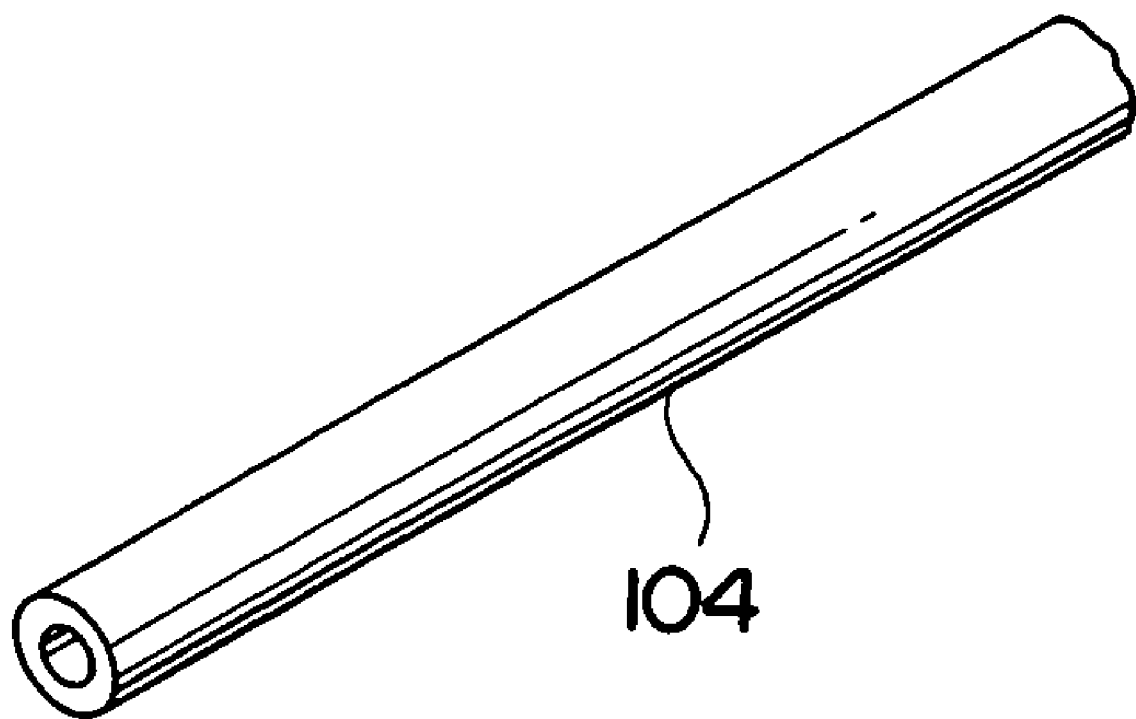
FIG. 18 is a perspective view of a form of a linear material used for the reinforcing beam.
Figure 19:
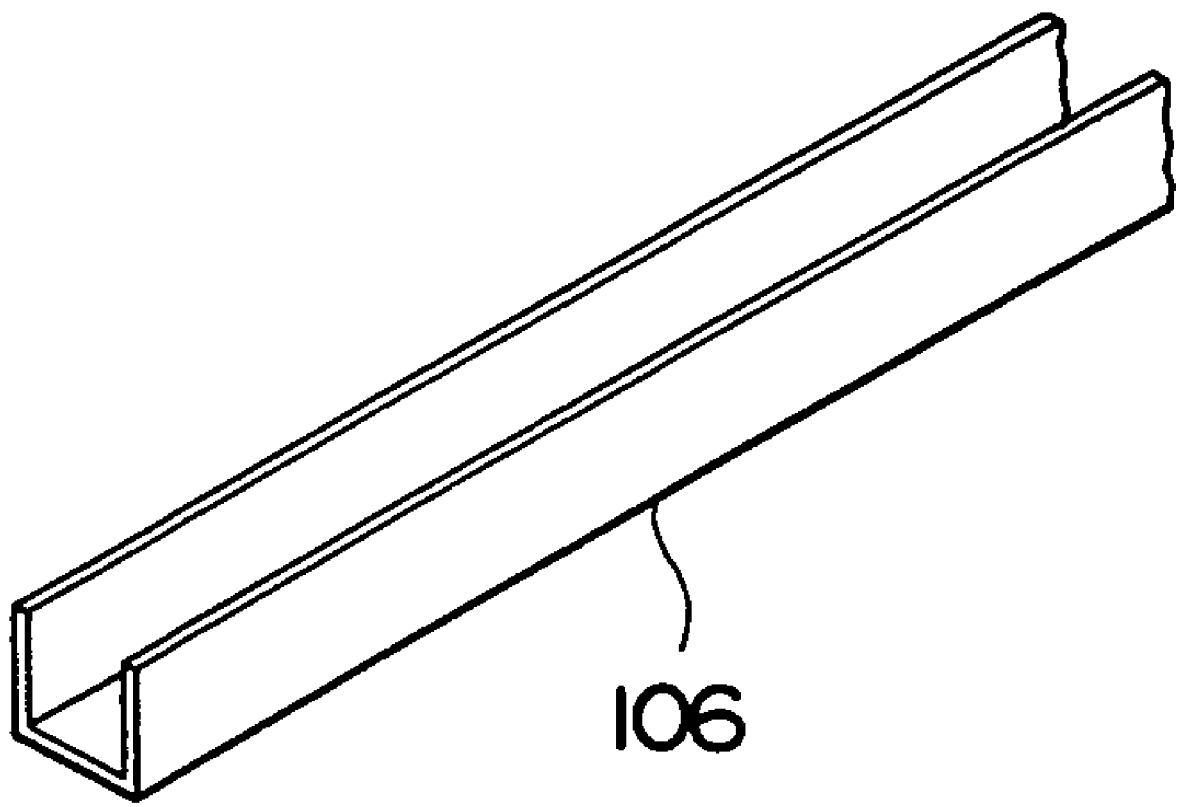
FIG. 19 is a perspective view of a form of a linear material used for the reinforcing beam.

For the linear material constituting the reinforcing beam 64, for example, a metal wire 100 in a round bar shape may be used as shown in FIG. 16; an angle material 102 with an L-shaped cross section may be used as shown in FIG. 17; a pipe material 104 may be used as shown in FIG. 18; and a channel material 106 with a C-shaped cross section may be used as shown in FIG. 19. When the metal wire 100 is used, the rigidity of the reinforcing beam 64 is dependent on the rigidity of the material, and if the angle material 102, the pipe material 104, or the channel material 106 is used, the rigidity of the material is enhanced by a shape.

To fix the reinforcing beam 64 to the optical guide plate 44, engaging concave portions may be formed in the side surfaces 60, 62 of the optical guide plate 44 to insert the end of the reinforcing member into each engaging concave portion and combine both components.

Although this embodiment shows an example of disposing a portion of the control apparatuses, i.e., the driver IC 94B on the chassis 84, this driver IC 94B may be disposed on the control substrate 92 along with the control IC 94A, etc. and may be contained within the range of the thickness $t_1$ (FIG. 9) of the light entrance surface 52 of the optical guide plate 44.

Sixth Embodiment

Figure 20:
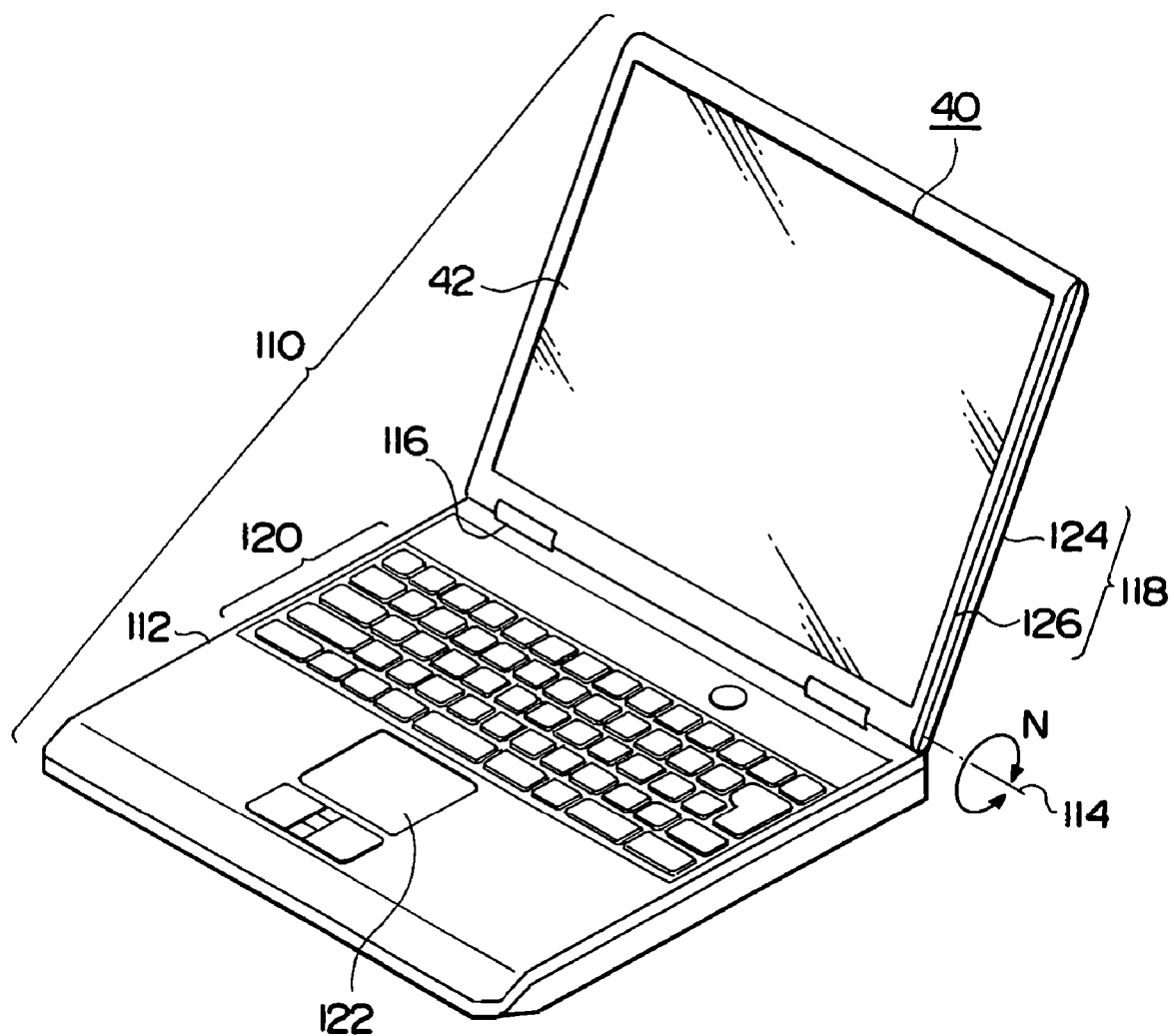
FIG. 20 is a perspective view of an information device according to a sixth embodiment.

A sixth embodiment of the present invention will be described with reference to FIG. 20. FIG. 20 schematically shows an exterior view of an information device according to the sixth embodiment, for example, a notebook-size personal computer (so-called notebook personal computer).

This notebook personal computer 110 includes a low-profile device body 112, and a display case 118 coupled to the device body 112 with a hinge portion 116 in a freely rotatable manner around a predetermined rotation axis 114 (arrow N). A so-called mother board (not shown) is incorporated in the case of the device body 112, and the mother board is mounted with a CPU (central processing unit), memory, etc., which are a processing unit that performs information processes. The CPU performs calculation processes based on OS (operating system) and application software fetched temporarily into the memory, for example. For the calculation processes of the CPU, a user can input various data and instructions with input apparatuses such as a keyboard 120 and a pointing device 122 mounted to the device body 112.

The display case 118 includes a base 124 and a cover 126 covering the base 124. The aforementioned displaying unit 40 (FIG. 6) is disposed between the cover 126 and the base 124 to display the aforementioned information process and contains the rectangular display panel 42 of a liquid crystal display (LCD). The screen of the display panel 42 projects and displays graphics and texts based on the aforementioned calculation processes of the CPU. The cover 126 and the base 124 may be formed of a resin material such as polycarbonate, for example.

In such a configuration, since the description has been made of the configuration of the displaying unit 40 built into the notebook personal computer 110 (FIGS. 6, 14, and 15), the reinforcing configuration of the optical guide plate 44 (FIGS. 6 to 13), and the material of the reinforcing beam 64 (FIGS. 16 to 19), the description thereof will be omitted. By applying the aforementioned reinforcing configuration of the optical guide plate 44 to this notebook personal computer 110, the resistance to changes in temperature and humidity of use environment is enhanced and a highly reliable information device is realized.

Although the present invention has been described with the information device composed of the device body and the display case in this embodiment, the present invention can also be implemented in an information device integrating the device body and the display case, such as a pen computer, PDA, and cellular phone.

Although the present invention has been described with the light source built into the information device in this embodiment, the present invention can also be implemented when using an external light source.

Although the most preferred embodiment, etc. of the present invention have been described as above, the present invention is not limited to the above description and can obviously be subjected to various modifications and changes by those who skilled in the art based on the gist of the present invention described in claims or disclosed in the best mode for carrying out the invention, and it is needless to say that such modifications and changes are included in the scope of the present invention.

The displaying unit, the optical guide plate, and the information device of the present invention can be used under the severe environment by reinforcing the optical guide plate with the reinforcing member to enhance the resistance to environmental temperature and environmental humidity, and such a reinforcing configuration can be widely and usefully applied to achieve lower profile and lighter weight.

What is claimed is:

1. A displaying unit comprising an optical guide plate that guides light of a light source for display on a display panel, the displaying unit comprising:
   a reinforcing member that bridges over the optical guide plate between side surfaces of the optical guide plate in a direction intersecting an incident direction of the light into the optical guide plates, the reinforcing member to be placed on the optical guide plate and to grip the optical guide plate at the side surfaces.

2. The displaying unit of claim 1, wherein the light source is disposed on the side surface of the displaying unit, and wherein the optical guide plate is formed with a thicker light entrance surface and a thinner side surface opposite to the light entrance surface and reflects the light on the back surface of the optical guide plate to guide the light to the back surface of the display panel.

3. The displaying unit of claim 2, wherein the reinforcing member is disposed on the back side of the optical guide plate, and wherein the thickness of the optical guide plate and the reinforcing member does not exceed the thickness of the light entrance surface of the optical guide plate.

4. The displaying unit of claim 2, wherein a control apparatus is disposed on the back surface of the optical guide plate, and wherein the thickness of the optical guide plate and the control apparatus does not exceed the thickness of the light entrance surface of the optical guide plate.

5. The displaying unit of claim 1, wherein the reinforcing member is fixed to the side surfaces of the optical guide plate.

6. The displaying unit of claim 1, wherein the reinforcing member is constituted by a plurality of beams.

7. The displaying unit of claim 6, wherein the reinforcing member is constituted by coupling each of the beams at the intermediate portion.

8. The displaying unit of claim 1, wherein a reflecting member is sandwiched between the reinforcing member and the optical guide plate.

9. The displaying unit of claim 1, comprising:
   a chassis disposed around the optical guide plate;
   a rib formed on the side surface of the optical guide plate; and
   a concave portion formed in the chassis correspondingly to the rib,
   wherein the rib with the reinforcing member fixed is inserted into the concave portion of the chassis.

10. The displaying unit of claim 1, wherein the reinforcing member is composed of an elastic linear material.

11. The displaying unit of claim 1, wherein the reinforcing member is composed of an angle material, a pipe material, or a channel material.

12. An optical guide plate guiding light of a light source for display on a display panel, the optical guide plate comprising:
a reinforcing member placed on a back side of the optical guide plate, that bridges over the optical guide plate between side surfaces in a direction intersecting an incident direction of the light, and grips the side surfaces.

13. The optical guide plate of claim 12, wherein the optical guide plate is formed with a thicker light entrance surface for the light of the light source and a thinner side surface opposite to the light entrance surface and reflects the light on the back surface of the optical guide plate to guide the light to the back surface of the display panel.

14. The optical guide plate of claim 13, wherein the reinforcing member is disposed on the back side of the optical guide plate, and wherein the thickness of the optical guide plate and the reinforcing member does not exceed the thickness of the light entrance surface of the optical guide plate.

15. The optical guide plate of claim 13, wherein a control apparatus is disposed on the back surface of the optical guide plate, and wherein the thickness of the optical guide plate and the control apparatus does not exceed the thickness of the light entrance surface of the optical guide plate.

16. The optical guide plate of claim 12, wherein the reinforcing member is fixed to the side surfaces of the optical guide plate.

17. The optical guide plate of claim 12, wherein the reinforcing member is constituted by a plurality of beams.

18. The optical guide plate of claim 17, wherein the reinforcing member is constituted by coupling each of the beams at the intermediate portion.

19. The optical guide plate of claim 12, wherein a reflecting member is sandwiched between the reinforcing member and the optical guide plate.

20. The optical guide plate of claim 12, comprising:
a chassis disposed around the optical guide plate;
a rib formed on the side surface of the optical guide plate; and
a concave portion formed in the chassis correspondingly to the rib,
wherein the rib with the reinforcing member fixed is inserted into the concave portion of the chassis.

21. The optical guide plate of claim 12, wherein the reinforcing member is composed of an elastic linear material.

22. The optical guide plate of claim 12, wherein the reinforcing member is composed of an angle material, a pipe material, or a channel material.

23. An information device comprising a processing unit that performs an information process, a display panel that displays the information process, and an optical guide plate that guides light of a light source for the display on the display panel, the information device comprising:
a reinforcing member bridging over the optical guide plate between the side surfaces of the optical guide plate in a direction intersecting an incident direction of the light into the optical guide plates, the reinforcing member to be placed on the optical guide plate and to grin the optical guide plate at the side surfaces.

24. The information device of claim 23, wherein the display panel and the optical guide plate are built into a display case, wherein the processing unit is built into a device body, and wherein the display case is coupled to the device body in a movable manner.

25. The information device of claim 23, wherein the light source is disposed on the side surface of the displaying unit, and wherein the optical guide plate is formed with a thicker light entrance surface and a thinner side surface opposite to the light entrance surface and reflects the light on the back surface of the optical guide plate to guide the light to the back surface of the display panel.

26. The information device of claim 25, wherein the reinforcing member is disposed on the back side of the optical guide plate, and wherein the thickness of the optical guide plate and the reinforcing member does not exceed the thickness of the light entrance surface of the optical guide plate.

27. The information device of claim 25, wherein a control apparatus is disposed on the back surface of the optical guide plate, and wherein the thickness of the optical guide plate and the control apparatus does not exceed the thickness of the light entrance surface of the optical guide plate.

28. The information device of claim 23, wherein the reinforcing member is fixed to the side surfaces of the optical guide plate.

29. The information device of claim 23, wherein the reinforcing member is constituted by a plurality of beams.

30. The information device of claim 29, wherein the reinforcing member is constituted by coupling each of the beams at the intermediate portion.

31. The information device of claim 23, wherein a reflecting member is sandwiched between the reinforcing member and the optical guide plate.

32. The information device of claim 23, comprising:
a chassis disposed around the optical guide plate;
a rib formed on the side surface of the optical guide plate; and
a concave portion formed in the chassis correspondingly to the rib,
wherein the rib with the reinforcing member fixed is inserted into the concave portion of the chassis.

33. The information device of claim 23, wherein the reinforcing member is composed of an elastic linear material.

34. The information device of claim 23, wherein the reinforcing member is composed of an angle material, a pipe material, or a channel material.

35. A displaying unit having an optical guide plate that guides light of a light source for display on a display panel, the displaying unit comprising:
a reinforcing member that bridges over the optical guide plate between side surfaces in the incident direction and the crossing direction of the light;
a chassis disposed around the optical guide plate;
a rib formed on the side surface of the optical guide plate; and
a concave portion formed in the chassis correspondingly to the rib,
wherein the rib to which the reinforcing member is fixed is inserted into the concave portion of the chassis.

* * * * *